(12) United States Patent
Kim et al.

(10) Patent No.: US 6,952,586 B2
(45) Date of Patent: Oct. 4, 2005

(54) FREQUENCY ALLOCATION SYSTEM FOR USE IN A WIRELESS COMMUNICATION SYSTEM AND METHOD FOR THE IMPLEMENTATION THEREOF

(75) Inventors: Duk-Yong Kim, Kyungki-do (KR); Yoon-Bae Lee, Kyungki-do (KR)

(73) Assignee: KMW Inc., Kyungki-do (KR)

(*) Notice: Subject to any disclaimer, the term of this patent is extended or adjusted under 35 U.S.C. 154(b) by 483 days.

(21) Appl. No.: 09/725,128

(22) Filed: Nov. 29, 2000

(65) Prior Publication Data

US 2002/0019235 A1 Feb. 14, 2002

(30) Foreign Application Priority Data

Aug. 3, 2000 (KR) ........................................ 2000-45107
Nov. 18, 2000 (KR) ........................................ 2000-68771

(51) Int. Cl.[7] ............................................... H04Q 7/20
(52) U.S. Cl. .................... 455/452.1; 455/450; 455/451; 455/435.1
(58) Field of Search ................................ 455/450, 451, 455/452.1, 453; 370/322, 329, 330, 341

(56) References Cited

U.S. PATENT DOCUMENTS

| 4,144,496 A | | 3/1979 | Cunningham et al. |
|---|---|---|---|
| 5,021,801 A | | 6/1991 | Smith et al. |
| 5,200,955 A | * | 4/1993 | McFarlane et al. ......... 370/315 |
| 34,796 A | | 11/1994 | Smith et al. |
| RE34,796 E | | 11/1994 | Smith et al. |
| 5,432,780 A | | 7/1995 | Smith et al. |
| 5,613,198 A | * | 3/1997 | Ahmadi et al. ............. 370/337 |
| 5,701,596 A | | 12/1997 | Meredith et al. |
| 5,752,200 A | | 5/1998 | Meredith et al. |
| 5,872,491 A | | 2/1999 | Kim et al. |
| 6,006,113 A | | 12/1999 | Meredith |
| 6,018,663 A | * | 1/2000 | Karlsson et al. ............ 455/450 |
| 6,104,930 A | | 8/2000 | Ward et al. |

FOREIGN PATENT DOCUMENTS

| EP | 0359535 | 3/1990 |
|---|---|---|
| EP | 0715477 | 6/1996 |
| EP | 0876074 | 11/1998 |
| WO | 00/22851 | 4/2000 |
| WO | 00/39943 | 7/2000 |

* cited by examiner

*Primary Examiner*—Temica Beamer
(74) *Attorney, Agent, or Firm*—Greenblum & Bernstein, P.L.C.

(57) ABSTRACT

A channel allocation (FA) system for use in a wireless communication system includes a controller, d number of combiners, d number of switchable power divider/combiners and d number of switches. The FA system allocates FAs to N number of sectors of a base transceiver station. In the system, the controller groups N sector into M small groups and determining d and f, wherein N and M are positive integers and d and f are the number of dynamic FAs and the number of fixed FAs, respectively. The combiners combine the dynamic and the fixed FAs for said each small group and output d number of signals. The switches selectively connect the output signals to the switchable power divider/combiners, whereby the switchable power divider/combiners amplify signals inputted thereto at the same level in amplitude. Although the BTS switchably shares the dynamic FAs at each of the sectors, its service coverage area does not change because the final output power level of each FA is the same in amplitude. Therefore, both the number of total FAs allocated to the BTS and the related devices can be reduced without changing its service coverage area.

45 Claims, 10 Drawing Sheets

FREQUENCY ALLOCATION SYSTEM FOR USE IN A WIRELESS COMMUNICATION SYSTEM AND METHOD FOR THE IMPLEMENTATION THEREOF

FIELD OF THE INVENTION

The present invention relates to a base transceiver station (BTS) for use in a wireless communication system; and, more particularly, to a frequency allocation system capable of selectively assigning fixed frequency allocations (FAs) and dynamic FAs to each sector of a BTS.

DESCRIPTION OF THE PRIOR ART

As is well known, a wireless communication system includes a plurality of base stations (BSs) dispersed across a geographic service area. Each of the BSs includes at least one antenna and a base transceiver system (BTS) and provides wireless service within a respective cell. The BTSs couple to base station controllers (BSCs) with each BSC serving a plurality of BTSs. The BSCs also couple to a mobile switching center (MSC) which interfaces to a public switched telephone network (PSTN) and other MSCs. Together, the BTSs, BSCs and the MSC form a wireless network which provides a wireless coverage to mobile stations (MSs) operating within a respective service area. For example, when the MS is in the service area of the BTS, the call from the MS is received by the BTS and is sent to the BSC. The call then gets passed to the MSC. After the call is processed, the processed information is passed to the other MS through the BSC and the BTS.

When a call is initiated or received from the MS, the call is sent as a signal to the BTS or the BSC. Ultimately, the MSC receives the call. The role of the BTS is to enable communication between the MS and the BSC. In conjunction with the BSC, the BTS enables the process to convert the MS or landline signals. The role of the BSC is to enable communication between the BTS and the MSC. The role of the MSC is to process the call received or sent. The processed information is communicated with the BSC so that the receiving MS can communicate with the sending MS.

The BTS includes at least one antenna, e.g., an array of antennas, and radio equipment such as a duplexer. In general, the BTS manages a cell area with dividing it into a plurality of sectors so as to efficiently transmit radio frequency (RF) signals. And, a number of FAs are allocated to each sector.

Referring to FIG. 1, there is shown an exemplary diagram of a prior art FA system incorporated into a BTS, which is configured in multi-sectors, and each sector handles the FAs. That is, the FAs handled are fixed in each sector as shown in FIG. 1. The FA system includes an array 10 of fixed combiners 11–16 and an array 20 of power divider/combiners. And, the array 20 of power divider/combiner has a number of fixed divider 31–36, a multiple number of multi-carrier power amplifiers (MCPAs) $M_{11}$–$M_{14}$, $M_{21}$–$M_{24}$, $M_{31}$–$M_{34}$, $M_{41}$–$M_{44}$, $M_{51}$–$M_{54}$, $M_{61}$–$M_{64}$ and a plurality of fixed combiners 21–26.

In this system, the BTS is configured with six sectors to cover its service area and four FAs FA#1, FA#2, FA#3, FA#4 are allocated to each sector to serve the maximum call-handling scheme. Accordingly, the BTS needs 24 FAs to cover its service area.

However, each sector call-handling request is not always the maximum. By configuring each sector for maximum call-handling scheme, there are several concerns and problems: the equipment is not used efficiently; the up-front equipment cost is high; and the transmitting equipment size increase.

In addition, the BTS coverage area is inefficient in case when some sectors' capacity is full and other sectors are not full. This is because the FAs are fixed in each sector (i.e., the FAs cannot be shared among sectors) and the sector at full capacity cannot take additional calls. A basic switch can be used to share the FAs among sectors. However, when the FAs are shared by using the basic switch, the amplifications for each FA are changed in each sector, which will, in turn, changes the service coverage area of the BTS and makes the BTS inoperative.

SUMMARY OF THE INVENTION

It is, therefore, an object of the present invention to provide a FA system capable of selectively assigning fixed FAs and dynamic FAs to each sector of a base transceiver station (BTS) by using an array of switchable power divider/combiners, whereby the system allows the sectors to share the dynamic FAs switchably, which will, in turn, reduces the number of multi-carrier power amplifier in comparison with a conventional BTS.

It is another abject of the present invention to provide a BTS incorporating therein a FA system capable of selectively assigning fixed FAs and dynamic FAs to each sector of the BTS.

In accordance with one aspect of the present invention, there is provided a system for allocating FAs to each of N sectors in a base transceiver station (BTS) for use in a mobile communication system, N being a positive integer, comprising: a controller for determining d# and f#, each representing the number of dynamic FAs and the number of fixed FAs, respectively; an array of sector amplifiers; and an array of switches for switchably connecting the dynamic FAs to the sector amplifiers.

In accordance with another aspect of the present invention, there is provided a system for allocating FAs to each of N sectors in a base transceiver station (BTS) for use in a mobile communication system, wherein N is a positive integer, comprising: a controller for grouping N sectors into M small groups and determining d and f for a small group, M being positive integer, d and f representing the number of dynamic FAs and the number of fixed FAs, respectively; d number of combiners for combining the fixed FAs and the dynamic FAs for said each small group and outputting d number of signals; d number of switchable power divider/combiners; and d number of first switches for selectively switching the output signals to the switchable power divider/combiners, whereby the switchable power divider/combiners amplify signals inputted thereto at the same power level.

In accordance with another aspect of the present invention, there is provided a method for allocating FAs to N sectors of a service area in a base transceiver station (BTS) for use in a wireless communication system, N being a positive integer, comprising the steps of: a) grouping said N sectors into a plurality of small groups based on subscriber's information; and b) determining the number of dynamic FAs and the number of fixed FAs for each small group based on the subscriber's information.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
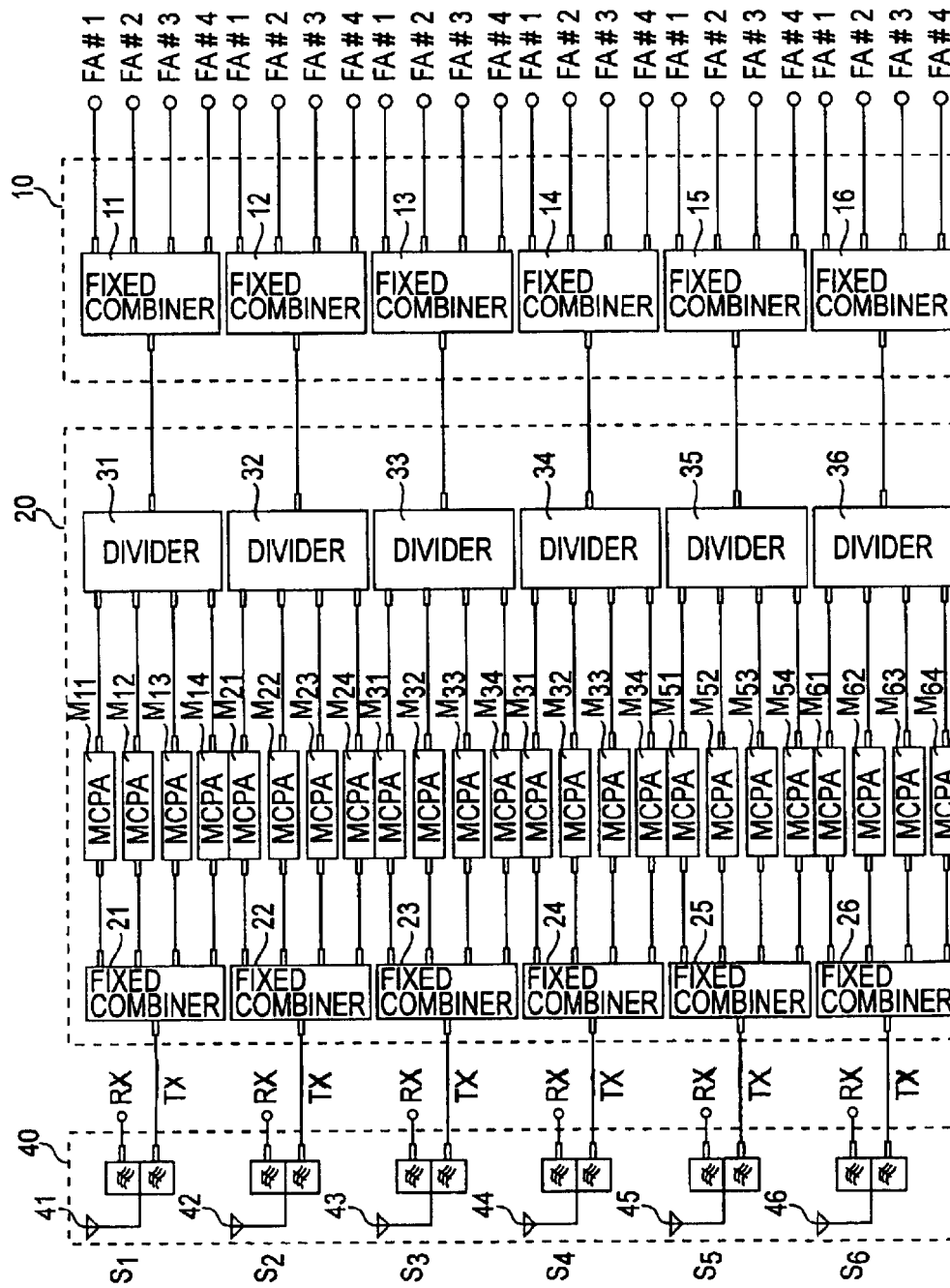
FIG. 1 shows an exemplary diagram of a prior art FA system incorporated into a BTS, which is configured in 6 sectors, and each sector handles 4 FAs.

There are illustrated in FIGS. 2 to 10 various views of a frequency allocation (FA) systems for use in a wireless communication and a flow chart setting forth a method for the implementation thereof in accordance with preferred embodiments of the present invention. It should be noted that like parts appearing in FIGS. 2 to 5 are represented by like reference numerals.

Figure 2:
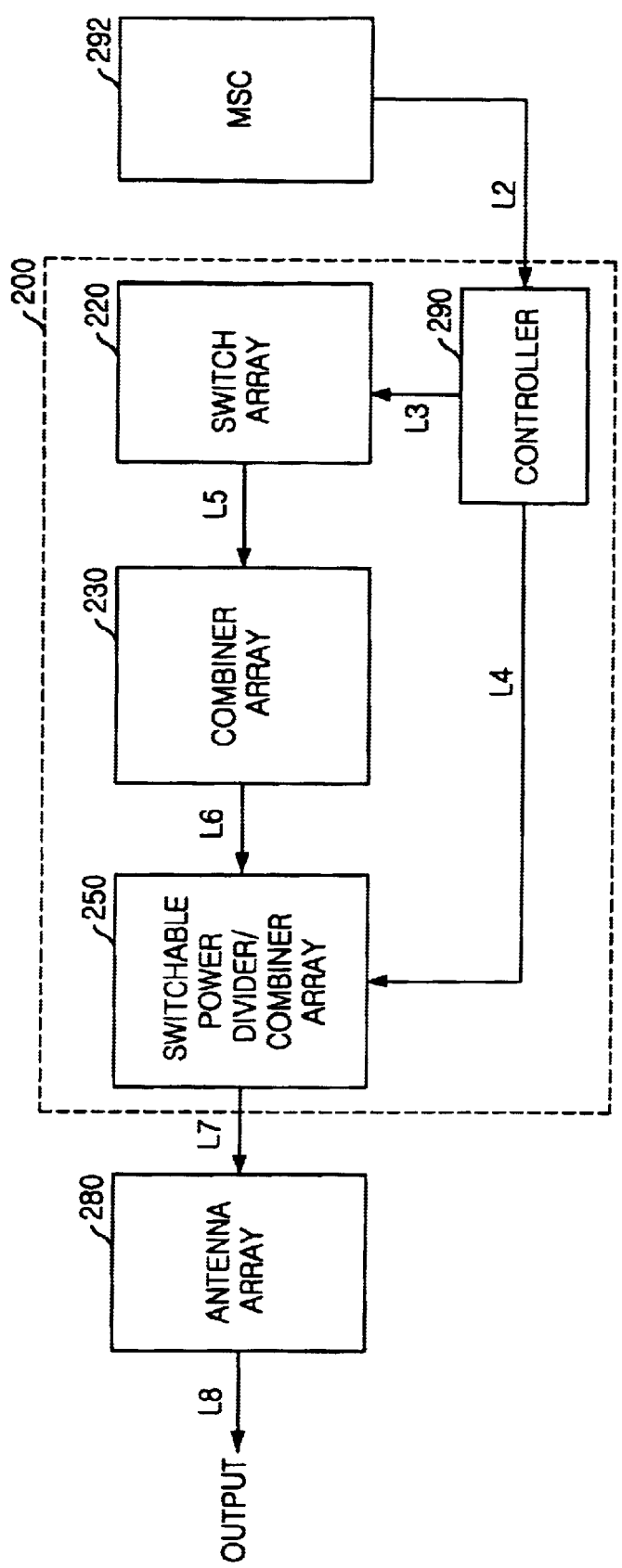
FIG. 2 depicts a schematic block diagram illustrating a BTS and a MSC in accordance with the present invention.

In FIG. 2, there is provided a schematic block diagram of an array of antennas 280 and a FA system 200 incorporated into a base transceiver station (BTS) and a mobile switching center (MSC) 292 for use in IMT 2000 communication system. The FA system 200 comprises a first set of switches 220, an array of combiners 230, a controller 290 and an array of switchable power divider/combiners 250. In a basic wireless system, communication among people at different locations are made possible through a MSC, a base station controller (BSC), a BTS and a mobile station (MS). The BTS receives signals from the BSC and through the communication between the MS and the BSC, people are able to speak or send data. The principles of the present invention also apply to other wireless communication system such as a wireless local loop (WLL), a broadband wireless local loop (B-WLL), a trunked radio system (TRS), a code division multi-access (CDMA) cellular, a personal communication system (PCS), an intelligent transportation system (ITS), and other wireless communication systems according to other standards.

In the FA system 200, the controller 290 generates a plurality of control signals, each including information of the number of small groups, the number of dynamic FAs and the number of fixed FAs allocated to a corresponding small group. The controller 290 provides the control signals to the array of switches 220 via a line L3 and to the array of switchable power divider/combiners 250 via a line L4. These control signals can be obtained from call request signals for each sector of a target BTS or also from the number of subscribers located in each sector of the target BTS. It should be noted that the call request signals and the number of subscribers are obtained from the MSC 292 through a line L2. It should be understood that the present invention is not limited to the location of the controller 290 provided that it gives the intended function during the operation of the FA system 200. Although the controller 290 is installed into a BTS control processor (BCP), which controls the operation of the BTS, the controller 290 can be installed into a BSC that controls several BTS, a call control processor (CCP) that controls the operation of the BSC including frequency control, frequency allocation and call signal process. Because the BTS is aware of the number of subscribers that are using MSs in each sector, the FAs can be switched to a target sector that has a high call volume or a high potential for calls. In accordance with the present invention, the FA system 200 can be selectively switched by the BCP signals inputted thereto from the BCP, which communicate with the CCP and include the information of subscribers.

The first set of switches 220 selectively switches the dynamic FAs to the array of combiners 230 based on the control signals transmitted through the line L3. The array of combiners 230 combines the switched dynamic FAs and the fixed FAs and outputs the combined signals to the array of switchable power divider/combiners 250 through a line L6. The array of switchable power divider/combiners 250 amplifies the combined signals and transmits the amplified signals to the array of antennas 280 through a line L7. The array of antennas 280 converts the amplified signals into radio frequency (RF) signals and radiates the RF signals into each sector in the BTS through a line L8.

Figure 3:
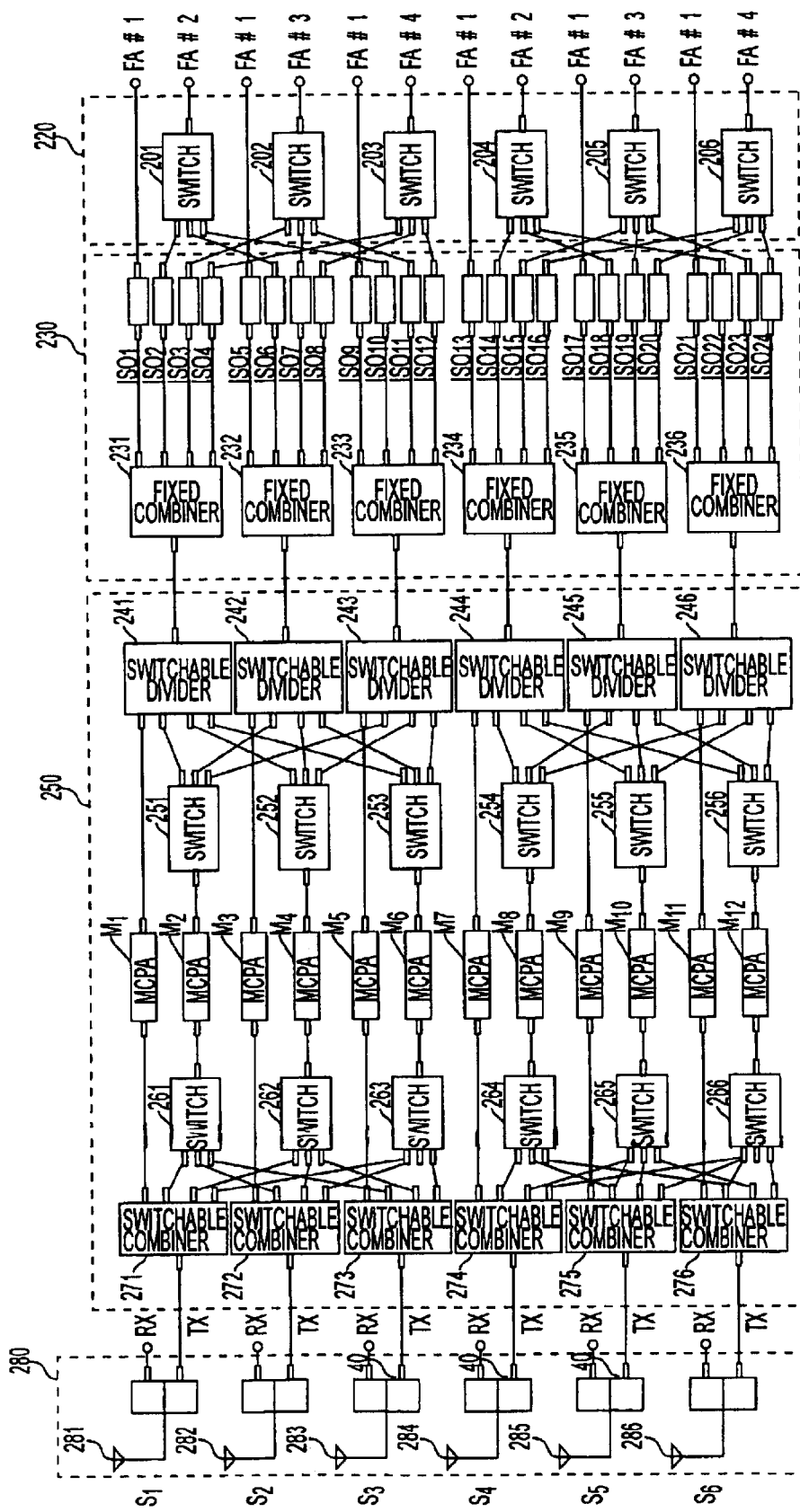
FIG. 3 is a detailed diagram of an array of antennas and a FA system for applying to IMT 2000 system in accordance with a first preferred embodiment of the present invention.

Referring to FIG. 3, there is shown a detailed diagram of an array of antennas 280 and a FA system 200 for applying to IMT 2000 system in accordance with a first preferred embodiment of the present invention, wherein the number of sectors $S_1$–$S_6$ in each BTS is determined to 6 for use in IMT 2000 system and an antenna element, e.g., 281, and a radio equipment are installed into each sector. Although a three dynamic FA configuration is shown in FIG. 3, there are several configurations to designate the dynamic FAs.

The combiner array 230 includes an array of fixed combiners 231–236 and a plurality of isolation resistors $ISO_1$–$ISO_{24}$. The switchable power divider/combiner array 250 includes an array of switchable divider 241–246, a second set of switches 251–256, an array of multi-carrier power amplifiers (MCPAs) $M_1$–$M_{12}$, a third set of switches 261–266 and an array of switchable combiners 271–276.

In the first preferred embodiment, the BTS is divided into 6 sectors, the number of total FAs is 12 and 6 sectors are grouped into a first small group $S_1$–$S_3$ and a second small group $S_4$–$S_6$. In the first group, one fixed FA FA#1 and three dynamic FAs FA#2, FA#3, FA#4 are allocated to the sector $S_1$ and two fixed FAs FA#1 are allocated to the sector $S_2$, $S_3$, respectively. On the other hand, one fixed FA FA#1 and two dynamic FAs FA#2, FA#3 are allocated to the sector $S_4$, one fixed FA FA#1 and one dynamic FA FA#4 are allocated to the sector $S_5$ and one fixed FA FA#1 is allocated to the sector $S_6$. All the switchable dividers 241–246 and combiners 271–276 are designed to operate at a 4-way in a maximum operating mode. The switchable dividers 241–243 and combiners 271–273 are able to change the number of ways for dividing or combining signals. Therefore, although the switchable dividers 241–243 and the switchable combiners 271–273 operate at a 4-way in a maximum operating mode, they can operate as a 3-way, a 2-way or a 1-way without degrading the performances thereof. For example, when one of them operates as a 3-way, one of paths is completely isolated and it operates as if the original operating mode is a 3-way. Also, each of the switches 201–206 and 261–266 has an input port and three output ports and each of the switches 251–256 has an output port and three input ports. That is, these switches are single pole three throw (SP3T) coaxial switch. SP3T enables a signal to be sent to one of three signal paths (1:3) or three signal paths to be sent to one path (3:1).

Figure 4:
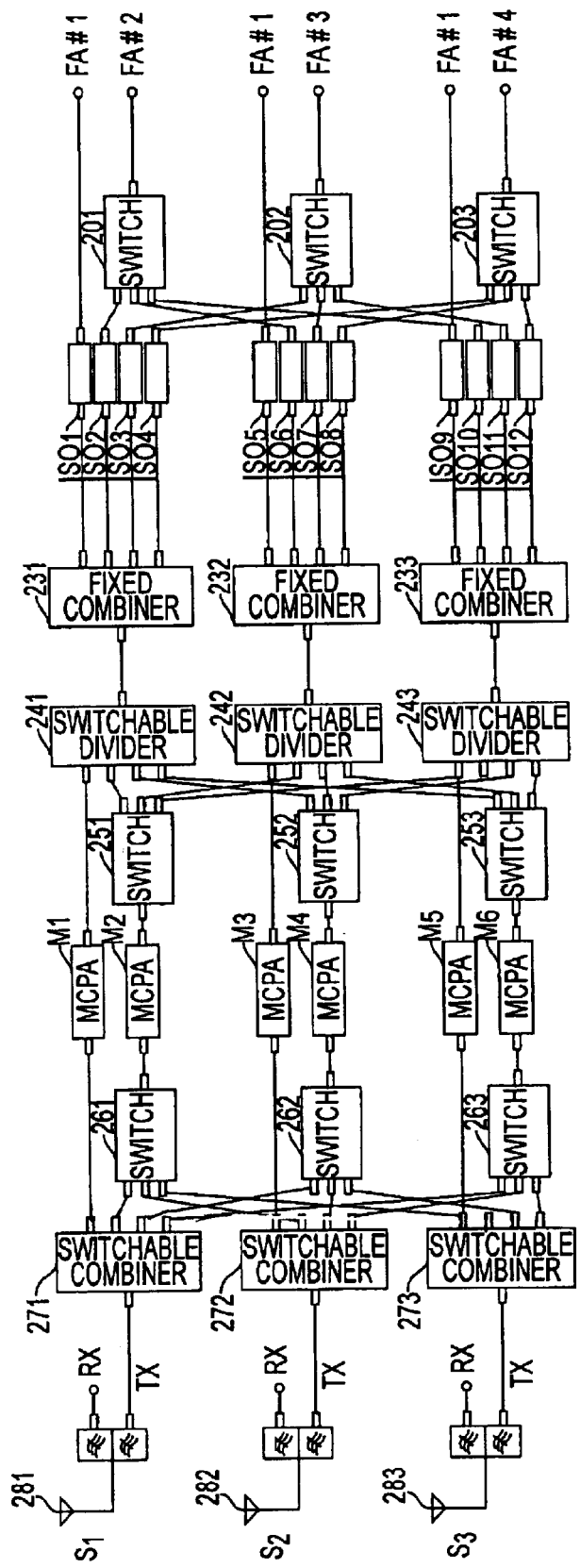
FIG. 4 represents an operational state of a first small group of FIG. 3.

Referring to FIG. 4, there is shown an operational state of the first small group of FIG. 3.

In this case, the number of fixed FAs FA#1 is 3 and the number of dynamic FAs FA#2, FA#3, FA#4 is 3. Each of the fixed FAs FA#1 is allocated to the fixed combiners 231, 232, 233 via the isolation resistors $ISO_1$, $ISO_5$, $ISO_9$, respectively, whereas each of the dynamic FAs FA#2, FA#3, FA#4 can be selectively allocated to the fixed combiners 231, 232, 233 by the switches 201, 202, 203. In this case, the switch 201 connects the dynamic FA FA#2 to the fixed combiner 231 via the isolation resistor $ISO_2$, the switch 202 connects the dynamic FA FA#3 to the fixed combiner 231 via the isolation resistor $ISO_3$ and the switch 203 connects the dynamic FA FA#4 to the fixed combiner 231 via the isolation resistor $ISO_4$.

In the fixed combiner 231, the fixed FA FA#1 and the dynamic FAs FA#2, FA#3, FA#4 inputted thereto are combined to output a combined signal to the switchable divider 241. The combined signal is divided into four divided signals, a first divided signal is inputted to the MCPA $M_1$, a second divided signal is inputted to the MCPA $M_2$ through the switch 251, a third divided signal is inputted to the MCPA $M_4$ through the switch 252 and a fourth divided signal is inputted to the MCPA $M_6$ through the switch 253.

In this stage, it is assumed that each FA has the same input operating power level (1PW) at each isolation resistor $ISO_1$–$ISO_{12}$, wherein PW means an operating power level. For example, in front of the MCPA $M_1$, the operating power level is 1PW, because the output signal of the fixed combiner 231 is 4PW (=1PW of FA#1+1PW of FA#2+1PW of FA#3+1PW of FA#4) and the output signal is divided ¼ and inputted to a corresponding MCPA. Therefore, the operating power levels are 1PW at each input port of the MCPAs $M_1$–$M_6$, and if the MCPA gain is G, the operating power levels become 1PW×G after passing through the MCPAs $M_1$, $M_2$, $M_4$, $M_6$.

On the other hand, in the fixed combiners 232, 233, the fixed FAs FA#1 are transmitted to the MCPAs $M_3$, $M_5$ through the switchable divider 242, 243, respectively. After passing through the MCPAs $M_3$, $M_5$, the operating power levels are (1PW of FA#1)×G, respectively.

That is, each FA is sent to a sector at the same output power level whether one or up to four FAs is used for one sector, whereby the service coverage area does not change. And also, by incorporating an array of phase shifters into the array of combiners 230, each MCPA can send an output signal that is equal in amplitude, phase and frequency.

The MCPAs $M_1$, $M_3$, $M_5$ amplify signals inputted thereto and output the amplified signals to the switchable combiners 271, 272, 273. The MCPAs $M_2$, $M_4$, $M_6$ also amplify signals inputted thereto and transmits the amplified signals to switchable combiner 271 through the switches 261, 262, 263, respectively.

The switchable combiner 271 is of a 4-way operating mode, whereas the switchable combiner 272, 273 are of a one-way operating mode. It should be noted that power levels of the output signals at each output port of the switchable combiners 271, 272, 273 are equal to each other.

Figure 6:
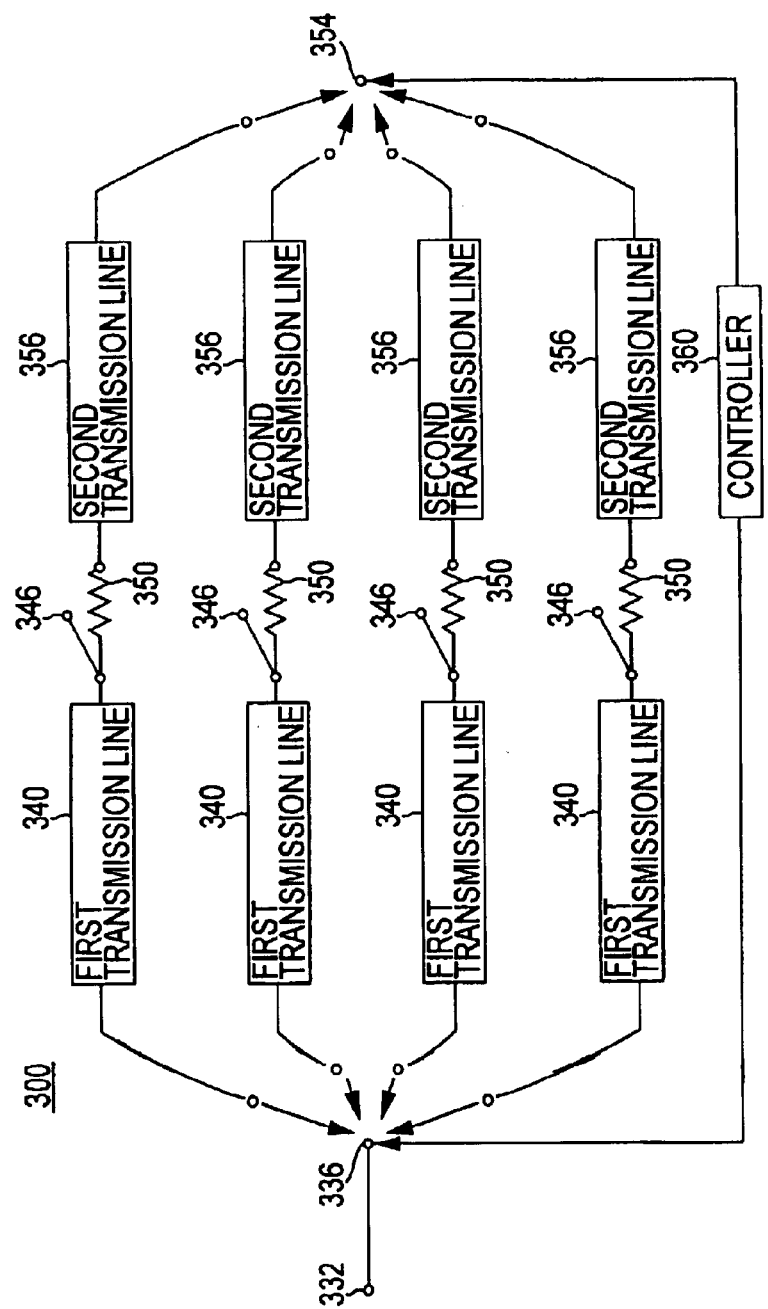
FIG. 6 illustrates a schematic representation of a switchable power divider/combiner for use in the present invention.

Referring to FIG. 6, there is a schematic representation of a switchable power divider/combiner 300 for use in the present invention. The switchable power divider/combiner 300 includes an input/output port 332, first transmission lines 340, second transmission lines 356, isolation resistors 350, a first switch 336 and a second switch 354. The switchable power divider/combiner 300 is described in a 4-way operating mode for the sake of simplicity. The switchable power divider/combiner 300 can serve as either a switchable power divider, e.g., 241, or a switchable power combiner, e.g., 271, depending upon the choice of ports for the input(s) and the output(s). If a port 332 is chosen to be an input port for receiving an RF signal, the switchable power divider/combiner 300 operates as a divider to equally divide a signal into 4 output signals. On the other hand, when the switchable power divider/combiner 300 is operated as a combiner, 4 ports 346 are used as input ports for coupling 4 RF input signals and the combined output will appear at the port 332. Thus, the terminology "divider" and "combiner" and the designation of "input" and "output" are somewhat arbitrary and therefore will be used interchangeably depending on the context in which they are used. The switchable power divider/combiner 300 is described in detail in commonly owned U.S. Pat. No. 5,872,491, issued Feb. 16, 1999, which is incorporated herein by reference.

Referring back to FIG. 4, the outputted signals from the switchable combiners 271, 272, 273 are transmitted to the antennas 281, 282, 283, respectively, and converted into RF signals to radiate the RF signals into each of the sectors $S_1$, $S_2$, $S_3$.

Figure 5:
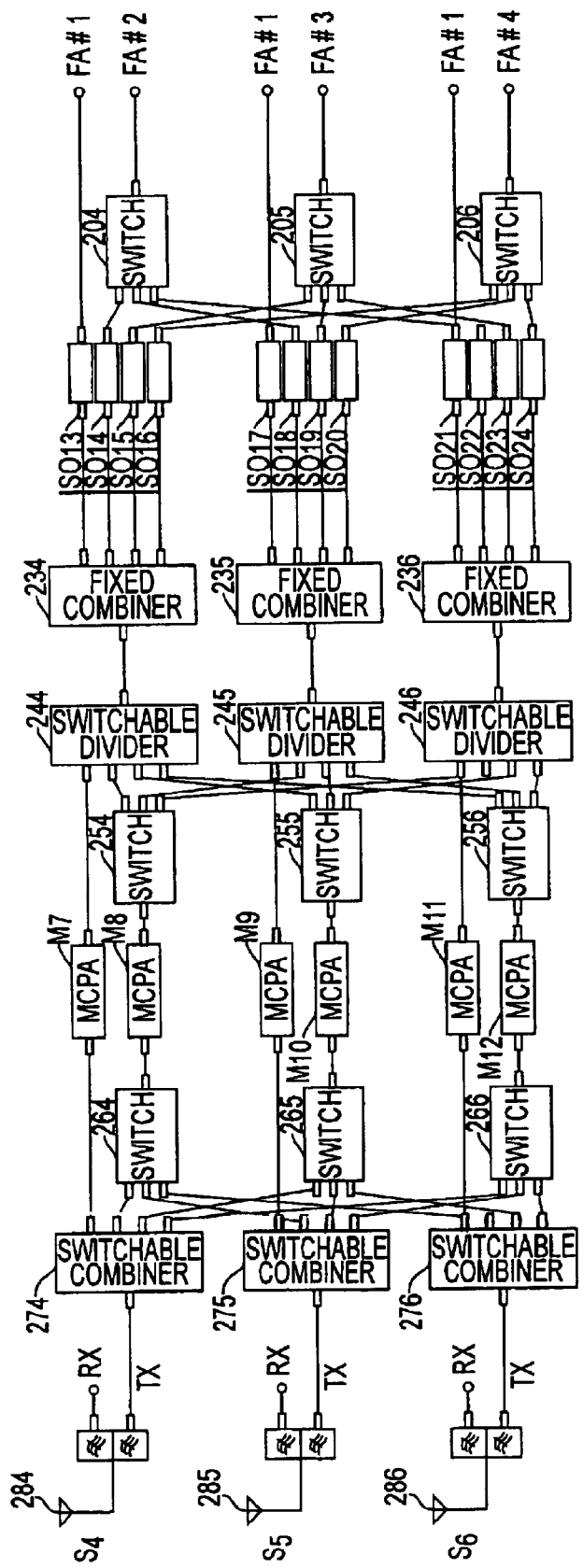
FIG. 5 illustrates an operational state of a second small group of FIG. 3.

Referring to FIG. 5, there is shown an operational state of the second small group of FIG. 3.

In this case, the number of fixed FAs FA#1 is 3 and the number of dynamic FAs FA#2, FA#3, FA#4 is 3. Each of the fixed FAs FA#1 is allocated to the fixed combiners 234, 235, 236 via the isolation resistors $ISO_{13}$, $ISO_{17}$, $ISO_{21}$, respectively. The switch 204 connects the dynamic FA FA#2 to the fixed combiner 234 via the isolation resistor $ISO_{14}$, the switch 205 connects the dynamic FA FA#3 to the fixed combiner 234 via the isolation resistor $ISO_{15}$ and the switch 206 connects the dynamic FA FA#4 to the fixed combiner 235 via the isolation resistor $ISO_{20}$.

In the fixed combiner 234, the fixed FA FA#1 and the dynamic FAs FA#2, FA#3 inputted thereto are combined to output a first combined signal to the switchable divider 244. The first combined signal is divided into three divided signals, a first divided signal is inputted into the MCPA $M_7$, a second divided signal is inputted into the MCPA $M_8$ through the switch 254 and a third divided signal is inputted to the MCPA $M_{10}$ through the switch 255. In the fixed combiner 235, the fixed FA FA#1 and the dynamic FA FA#4 inputted thereto are combined to output a second combined signal. The second combined signal is divided into two divided signals through the switchable divider 245, one of them is inputted into the MCPA $M_9$ and the other is inputted into the MCPA $M_{12}$ through the switch 256. On the other hand, in the fixed combiner 236, the fixed FAs FA#1 are transmitted to the MCPA $M_{11}$ through the switchable divider 246.

The MCPAs $M_7$, $M_9$, $M_{11}$ amplify signals inputted thereto and output the amplified signals to the switchable combiners 274, 275, 276. The MCPAs $M_8$, $M_{10}$ also amplify signals inputted thereto and transmit the amplified signals to the switchable combiners 274 through the switches 264, 265, 266 in the third set, respectively. The MCPA $M_{12}$ also amplifies a signal inputted thereto and transmits the amplified signal to the switchable combiner 275 through the switch 266.

The switchable combiners 274, 275 are of a 3-way operating mode and a 2-way operating mode, respectively, whereas the switchable combiner 276 is of a one-way operating mode. At each output port of the switchable combiners 274, 275, 276, power levels of FAs are equal to each other. The other operational schemes are similar to those of the first group shown in FIG. 4.

The outputted signals from the switchable combiners 274, 275, 276 are transmitted to the antennas 284, 285, 286, respectively, and converted into RF signals to radiate into each of the sectors $S_4$, $S_5$, $S_6$.

In comparison with the prior art FA system and a method for the implementation thereof which needs 24 FAs to configure the same system of the first preferred embodiment, the first preferred embodiment of the present invention can cover the same area with twelve FAs, thereby drastically reducing the related devices such as MCPA, a frequency modulator/demodulator, a frequency up/down converter and the others. In the present invention, although the BTS switchably shares the dynamic FAs at each of the sectors, its service coverage area does not change because the final output level of each FA is the same in amplitude.

Figure 7:
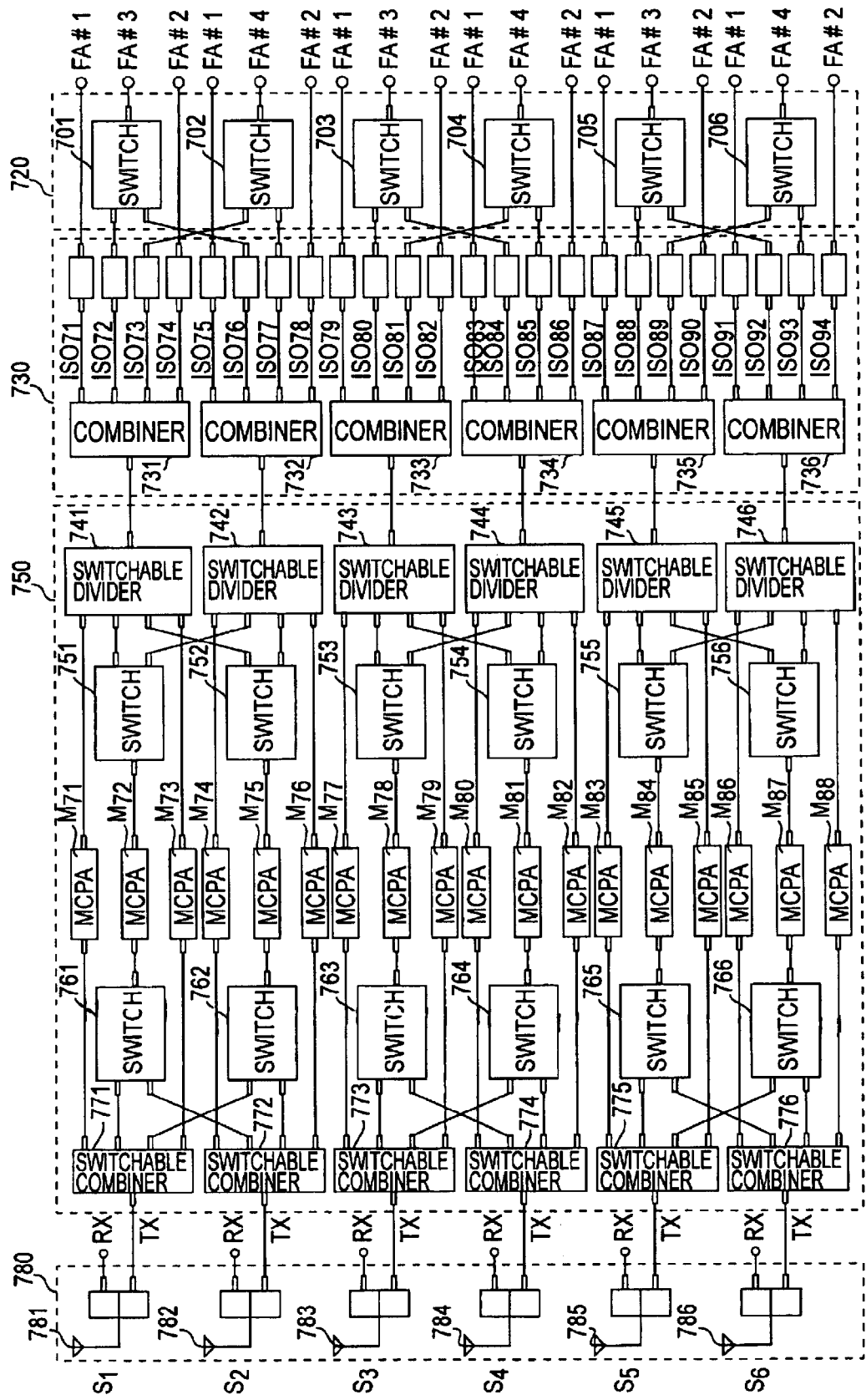
FIG. 7 is a system diagram of a FA system for dividing a service coverage area into 6 sectors and the number of total FAs is determined to 18 in accordance with the present invention, wherein 18 FAs are grouped into six three FAs.

Referring to FIG. 7, there is shown a system diagram of a second preferred embodiment of the present invention with 6 sectors when the number of total FAs is 18 and 18 FAs are grouped into six small groups, each small group having three FAs.

In the second preferred embodiment, the FA system comprises a first set 720 of switches 701–706, an array 730 of combiners 731–736, an array 750 of switchable power divider/combiners and a controller (not shown). The array 750 of switchable power divider/combiners includes an array of switchable divider 741–746, a second set of switches 751–756, an array of MCPAs $M_{71}$–$M_{88}$, a third set of switches 761–766 and an array of switchable combiners 771–776. All the switches 701–706, 751–756 and 761–766 enable a signal to be sent to one of signal paths (1:2) or two signal paths to be sent to one path (2:1). And, the switchable dividers 741–746 and the switchable combiners 771–776 operate at a 4-way in a maximum operating mode.

The number of total FAs of a BTS in the limited frequency is determined based on requirements for a wireless communication system; the fixed FAs and the dynamic FAs can be configured for several combinations within the total FA #. If the number of FAs is estimated for a coverage area of the BTS at the beginning of design, the overall system investment at the beginning of the system rollout can be reduced significantly. And the BTS can be built economically and efficiently compared to cost and equipment needed if designed to the prior art's configuration. The FA system can choose an optimum configuration among various schemes, e.g., the first and the second preferred embodiments, based on the requirements.

Figure 8:
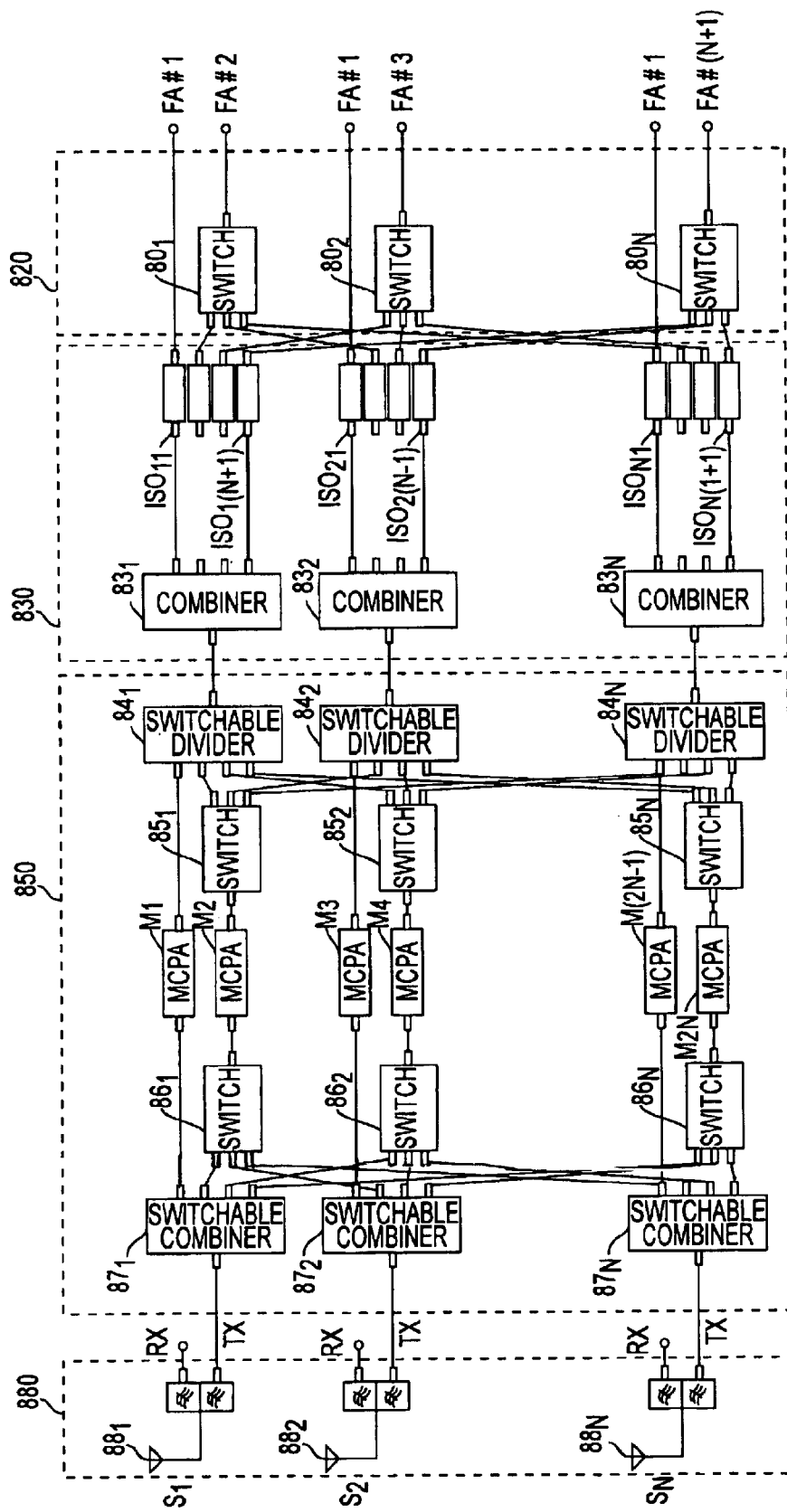
FIG. 8 shows a schematic diagram of a basic configuration for N sectors with grouping N sector into one small group.

FIG. 8 shows the basic configuration for N sectors with grouping N sectors into M small groups in accordance with a third preferred embodiment of the present invention, wherein N is a positive integer and M is 1. If the basic operation processes of the first and the second embodiments are understood, N sectors with N dynamic FA can be understood.

If a BTS is divided into N sectors, which are grouped into a plurality of small groups, the number of dynamic FAs and the number of fixed FAs are determined to d# and f# for each small group, the number of total FAs becomes a sum of d# and f#. In each small group, the number of fixed combiners, the number of switchable combiners and the number of switchable dividers are equal to d#. Also, the number of input ports or output ports in each switch is equal to d#.

In accordance with the present invention, in each small group, the number of MCPAs is determined to the number of total FAs. And also, the number of input ports for one fixed combiner is determined by as follows:

$k = f\#/d\# + d\#$ wherein, k represents the number of input ports for one fixed combiner. Therefore, if N, d#, f# and the number of small groups are determined, the FA system can be automatically configured in such a way that it can switchably allocate the dynamic FAs in accordance with the present invention.

Figure 9:
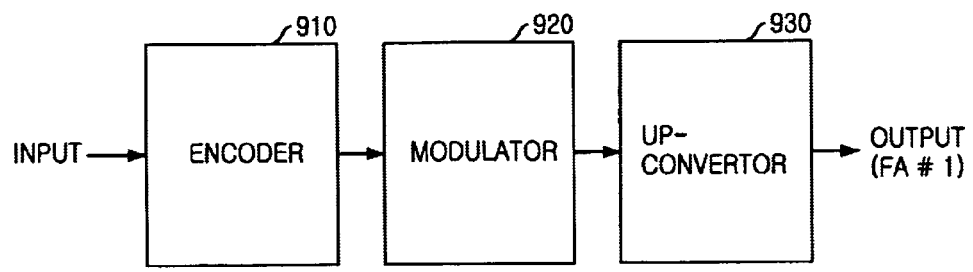
FIG. 9 represents a schematic block diagram of several related devices.

FIG. 9 shows a schematic block diagram of several related devices.

Conventionally, in order to allocate FAs to a BTS, the BTS must have an encoder 910, a modulator 920 and an up-convertor 930 per FA. Therefore, the present invention can reduce the related devices since it can cover the same service area with reducing the number of total FAs allocated to the BTS. That is, the overall system investment at the beginning of the system rollout can be reduced significantly. And the BTS can be built economically and efficiently compared to cost and equipment needed if designed to the prior art's configuration.

Figure 10:
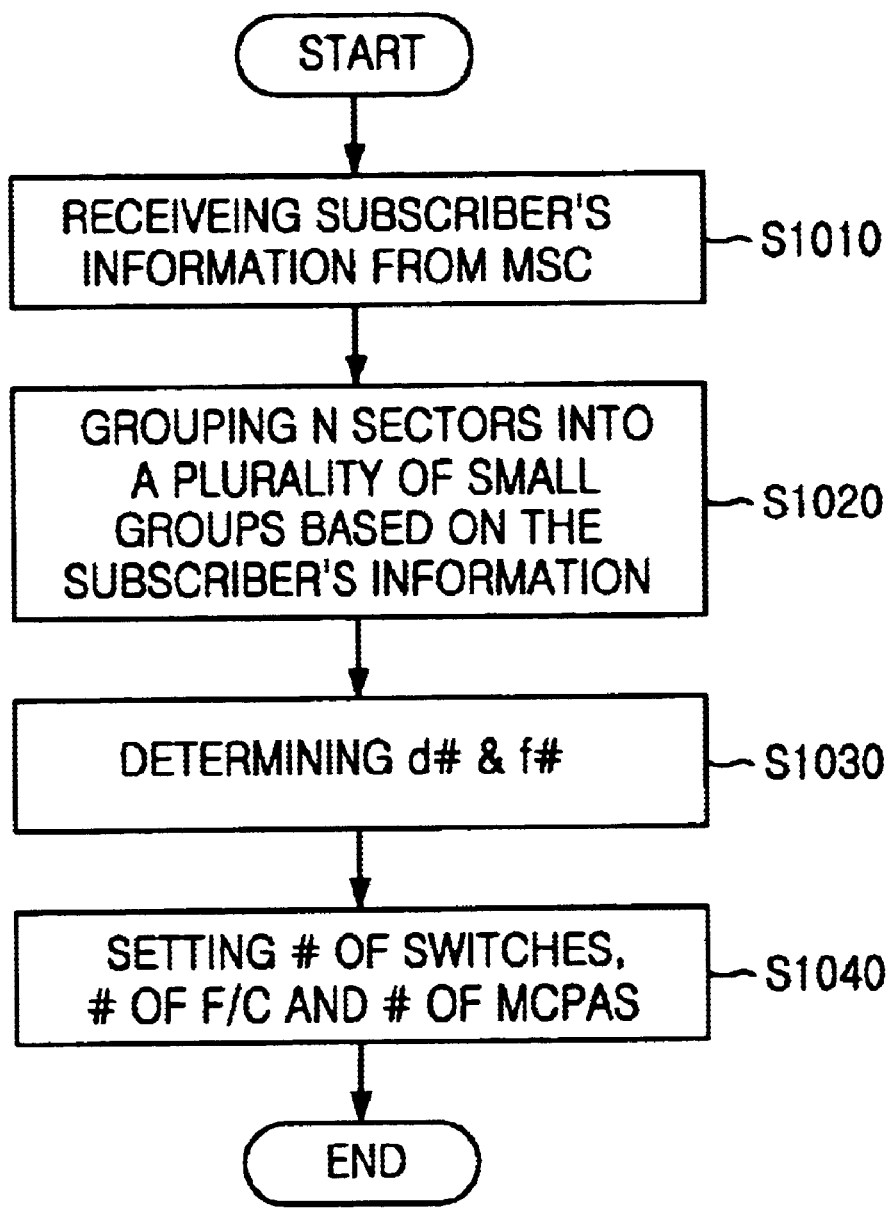
FIG. 10 is a flow chart showing an operation of frequency allocation in accordance with the present invention.

FIG. 10 is a flow chart illustrating the operation of a FA system in accordance with present invention. The FA system allocates FAs to N number of sectors of a service area in a BTS for use in a wireless communication system. The N is determined based on a requirement for a wireless communication system.

At step S1010, a controller communicates with a MSC for receiving subscriber's information. Next, at step S1020, the controller groups N sectors into a plurality of small groups based on the subscriber's information. At step S1030, the controller determines d# and f# for each small group, wherein d# is the number of dynamic FAs and f# is the number of fixed FA for each small group. Thereafter, at step S1040, the number of switches, the number of fixed combiners (F/Cs) and the number of MCPAs are set based on d# and f#.

The present invention can also be installed in other future wireless communication systems such as a universal mobile telecommunication system (UMTS).

In accordance with the present invention, the inventive BTS can switch the dynamic FAs to the high volume call or high potential call sectors of the BTS without sacrificing the service coverage area.

While the present invention has been described with respect to the particular embodiments, it will be apparent to those skilled in the art that various changes and modifications may be made without departing from the scope of the invention as defined in the following claims.

What is claimed is:

1. A system for allocating frequency allocations (FAs) to each of N sectors in a base transceiver station (BTS) for use in a mobile communication system, N being a positive integer, the system comprising:
   a determiner that determines d# and f#, each representing a number of dynamic FAs and a number of fixed FAs, respectively, for each sector based on one of call requests or subscriber information;
   an array of sector amplifiers; and
   a switch that switchably connects the dynamic FAs to the sector amplifiers,
   wherein each of the sector amplifiers amplifies a corresponding output signal and each of the sector amplifiers includes:
   a switchable divider that switchably divides the corresponding signal;
   a plurality of multi-carrier power amplifiers (MCPAs) that amplify the divided signal; and
   a switchable combiner that switchably combines the amplified signal.

2. The system of claim 1, further comprising an array of combiners that combine the dynamic FAs and the fixed FAs and that output d# output signals.

3. The system of claim 1, wherein the sector amplifier further includes:
   a first switch that selectively connects the corresponding signal to the MCPAs in the array of sector amplifiers; and
   a second switch that selectively connects the amplified signal to the switchable combiners in the array of sector amplifiers.

4. The system of claim 3, further comprising an array of isolation resistors that prevent interference between signals input into the sector amplifiers.

5. The system of claim 4, further comprising an array of phase shifters that match the signals in phase.

6. The system of claim 1, wherein when j FAs are allocated to a selected sector amplifier, the corresponding switchable divider and combiners operate in j-way, j being a positive integer.

7. The system of claim 6, wherein when the j number of FAs are allocated to the selected sector amplifier, each FA has the same power level at an output port of the selected sector amplifier.

8. A base station (BS) for allocating frequency allocations (FAs) to each of N sectors incorporated therein, wherein N is a positive integer, the base station (BS) comprising:
 a controller that groups N sectors into M groups and determines d and f for each group, M being positive integer, d and f representing the number of dynamic FAs and the number of fixed FAs, respectively;
 d number of combiners that combine the fixed FAs and the dynamic FAs for each said group and that output d number of signals;
 d number of switchable power divider/combiners; and
 d number of first switches that selectively switch the output signals to the switchable power divider/combiners, whereby the switchable power divider/combiners amplify signals input thereto at the same power level.

9. The base station of claim 8, wherein the controller calculates N, M, d and f by using call request information corresponding to each sector.

10. The base station of claim 9, wherein the call request information is retrieved from a mobile switching center.

11. The base station of claim 10, wherein the controller calculates N, M, d and f by using a number of subscribers located in each sector of a target base station.

12. The base station of claim 11, wherein information regarding the number of subscribers is retrieved from a mobile switching center.

13. The base station of claim 8, wherein the controller is located at the BS.

14. The base station of claim 8, wherein the controller is located at a call control processor (CCP).

15. The base station of claim 8, wherein the fixed FAs are allocated to all of the combiners.

16. The base station of claim 8, wherein said switchable power divider/combiners include:
 d number of switchable power dividers, each dividing an input signal into a number of divided signals, wherein each of the switchable power dividers is configured to control a number of divided signals;
 a number of multi-carrier power amplifiers (MCPAs) that amplify the divided signals; and
 d number of switchable power combiners, each combining a plurality of input signals into an output signal, wherein each of the switchable power combiners is configured to control the number of input signals.

17. The base station of claim 16, wherein when j FAs are allocated to a predetermined sector, the corresponding switchable power dividers and combiners operates in j-way, j being a positive integer.

18. The base station of claim 16, wherein the number of MCPAs is the number of total FAs which is the sum of d and f.

19. The base station of claim 16, the switchable power divider/combiners further include:
 d number of second switches that selectively switch the divided signals from the switchable power dividers to the MCPAs; and
 d number of third switches that selectively switch signals amplified by the MCPAs to the switchable power combiners.

20. The base station of claim 16, wherein each of the switchable power dividers includes:
 an input port that receives an input signal;
 a common node;
 k number of first transmission lines, k being a positive integer;
 k number of second transmission lines;
 k number of isolation elements disposed between the first and the second transmission lines, wherein each isolation element is electrically connected to corresponding first and second transmission lines, respectively;
 k number of output ports that output k number of output signals, each of the output ports is connected between a corresponding isolation element and one of a first and a second transmission line;
 k number of fourth switches that selectively switch the input signal to the first transmission line; and
 k number of fifth switches that selectively switch the common node to the second transmission line based on the first switches.

21. The base station of claim 20, wherein k is equal to (f/d)+d.

22. The base station of claim 21, wherein each of the combiners includes:
 an output port that outputs an output signal;
 a common node;
 k number of first transmission lines;
 k number of second transmission lines;
 k number of isolation elements disposed between the first and the second transmission lines, wherein each isolation element is electrically connected to corresponding first and second transmission lines, respectively;
 k number of input ports that receive k number of input signals, each of the input ports is connected between a corresponding isolation element and one of a first and a second transmission line;
 k number of sixth switches that selectively switch the input signal to the first transmission line; and
 k number of seventh switches that selectively switch the common node to the second transmission line based on the first switches.

23. The base station of claim 22, wherein a power level of each FA becomes the same value at each output port of the switchable combiners.

24. The base station of claim 19, wherein each of the first and the third switches has d number of output ports.

25. The base station of claim 19, wherein each of the second switches has d number of input ports.

26. The base station of claim 16, further comprising:
 d number of antennas electrically connected to said MCPAs, wherein each of the antenna converts the amplified signals into radio frequency (RF) signals to be sent into each sector in the group, respectively.

27. The base station of claim 21, further comprising: k number of isolation resistors that prevent interference between signals input to each combiner.

28. The base station of claim 23, further comprising:
 k number of phase shifters in front of each combiner that control phases of signals input thereto.

29. The base station of claim 8, wherein N is equal to 6 so as to implement a BS for use in an IMT 2000 communication system.

30. A method for allocating frequency allocation (FAs) to N sectors of a service area in a base transceiver station (BTS) for use in a wireless communication system, N being a positive integer, the method comprising:

grouping said N sectors into a plurality of groups based on subscriber's information;

determining, with a controller, a number of dynamic FAs and a number of fixed FAs for each group based on one of call requests or the subscriber's information; and setting a number of switches, a number of switchable power divider/combiners and a number of ports based on the number of dynamic FAs and the number of fixed FAs.

31. The method of claim 30, further comprising:

amplifying the dynamic FAs and the fixed FAs by using an array of sector amplifiers; and switchably connecting the dynamic FAs to the array of sector amplifiers.

32. The method of claim 31, wherein the amplifying includes:

combining the dynamic FAs and the fixed FAs by using an array of fixed combiners;

switchably dividing the combined FAs by using an array of switchable dividers;

amplifying the combined signals by using a plurality of multi-carrier power amplifiers (MCPAs); and combining the amplified FAs into s# output signals to be sent to sectors in a corresponding group, respectively, by using an array of switchable combiners, s# representing the number of total FAs per group.

33. The method of claim 32, wherein the number of fixed combiners is equal to that of the dynamic FAs.

34. The method of claim 33, wherein a number of input ports of each fixed combiner is defined as:

$$k=(f\#/d\#)+d\#$$

wherein k, f# and d# represent the number of input ports per fixed combiner, the number of fixed FAs and the number of dynamic FAs, respectively.

35. The method of claim 34, wherein the number of MCPAs is equal to s#, which is the sum of f# and d#.

36. The method of claim 35, wherein f#/d# is greater than 1.

37. The method of claim 34, wherein each of the switchable power dividers and combiners operates in a d#-way in a maximum operating mode.

38. The method of claim 32, wherein j FAs are allocated to a predetermined sector, the corresponding switchable divider and combiner operate in j-way, j being a positive integer.

39. The method of claim 30, wherein the subscriber's information is call request information corresponding to each sector.

40. The method of claim 39, wherein the call request information is retrieved from a mobile switching center.

41. The method of claim 30, wherein the subscriber's information is the number of subscribers located in each sector of a target base station.

42. The method of claim 41, wherein information regarding the subscriber's number is retrieved from a mobile switching center.

43. The method of claim 30, wherein N is equal to 6 so as to implement a BTS for use in an IMT 2000 communication system.

44. A system for allocating frequency allocations (FAs) to each of N sectors in a base transceiver station (BTS) for use in a mobile communication system, N being a positive integer, the system comprising:

a determiner that determines d# and f#, each representing a number of dynamic FAs and a number of fixed FAs, respectively;

an array of sector amplifiers;

a switch that switchably connects the dynamic FAs to the sector amplifiers;

an array of combiners that combine the dynamic FAs and the fixed FAs and that output d# output signals; and wherein each of the sector amplifiers amplifies a corresponding output signal, each of the sector amplifiers including a switchable divider that switchably divides the corresponding signal;

a plurality of multi-carrier power amplifiers (MCPAs) that amplify the divided signal; and a switchable combiner that switchably combines the amplified signal.

45. A method for allocating frequency allocation (FAs) to N sectors of a service area in a base transceiver station (BTS) for use in a wireless communication system, N being a positive integer, the method comprising:

grouping said N sectors into a plurality of groups based on subscriber's information;

determining a number of dynamic FAs and a number of fixed FAs for each group based on the subscriber's information;

setting a number of switches, a number of switchable power divider/combiners and a number of ports based on the number of dynamic FAs and the number of fixed FAs;

amplifying the dynamic FAs and the fixed FAs by using an array of sector amplifiers; and switchably connecting the dynamic FAs to the array of sector amplifiers;

wherein the amplifying includes;

combining the dynamic FAs and the fixed FAs by using an array of fixed combiners;

switchably dividing the combined FAs by using an array of switchable dividers;

amplifying the combined signals by using a plurality of multi-carrier power amplifiers (MCPAs); and combining the amplified FAs into s# output signals to be sent to sectors in a corresponding group, respectively, by using an array of switchable combiners, s# representing the number of total FAs per group.

* * * * *